(12) United States Patent
Tsai et al.

(10) Patent No.: US 8,619,672 B2
(45) Date of Patent: Dec. 31, 2013

(54) APPARATUS AND METHOD FOR MULTI-SECTOR VELOCITY MOBILE VELOCITY AND DOPPLER ESTIMATE FOR SYNCHRONOUS COMMUNICATION SYSTEMS

(75) Inventors: Ming-Chang Tsai, San Diego, CA (US); Jigneshkumar P. Shah, San Diego, CA (US); Pillappakkam B. Srinivas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 12/481,186

(22) Filed: Jun. 9, 2009

(65) Prior Publication Data

US 2009/0310505 A1 Dec. 17, 2009

Related U.S. Application Data

(60) Provisional application No. 61/060,703, filed on Jun. 11, 2008.

(51) Int. Cl.
*H04W 64/00* (2009.01)
(52) U.S. Cl.
USPC .......... 370/328; 370/252; 370/310.2; 367/90; 367/94
(58) Field of Classification Search
USPC ......... 370/252, 310.2, 328; 455/404.2, 456.1, 455/456.5; 367/90, 94
See application file for complete search history.

(56) References Cited

U.S. PATENT DOCUMENTS

| | | | |
|---|---|---|---|
| 5,570,305 A | * | 10/1996 | Fattouche et al. ............. 708/203 |
| 5,999,124 A | | 12/1999 | Sheynblat |
| 6,081,691 A | | 6/2000 | Renard et al. |

(Continued)

FOREIGN PATENT DOCUMENTS

| EP | 1081503 A2 | 3/2001 |
|---|---|---|
| JP | H11103480 A | 4/1999 |

(Continued)

OTHER PUBLICATIONS

Po-Ying Chen and Hsueh-Jyh Li, "An Iterative Algorithm for Doppler Spread Estimation in LOS Environments" Jun. 2006, IEEE Transactions on Wireless Communications, Vol. 5, No. 6, pp. 1223-1228.*

(Continued)

*Primary Examiner* — Omer Mian
(74) *Attorney, Agent, or Firm* — Donald C. Kordich

(57) ABSTRACT

An apparatus and method for estimating velocity and Doppler frequency comprising acquiring a first plurality of time-of-arrival (TOA) measurements from a first plurality of base stations at a first time; acquiring a second and a third plurality of TOA measurements from a second and third plurality of base stations at a second time and a third time; determining a plurality of line-of-sight distance measurements using the first, second and third pluralities of TOA measurements; determining a plurality of velocity estimates and a plurality of angle of arrival (AOA) estimates, using the plurality of LOS distance measurements; determining a plurality of Doppler frequency estimates using the plurality of velocity estimates and the plurality of AOA estimates; and using a processor for determining an average Doppler frequency estimate over a plurality of sectors, wherein the first, second and third pluralities of TOA measurements are acquired over the plurality of sectors.

18 Claims, 12 Drawing Sheets

(56) References Cited

U.S. PATENT DOCUMENTS

| | | | |
|---|---|---|---|
| 6,128,327 A * | 10/2000 | Bird et al. ............ 375/132 |
| 6,266,014 B1 * | 7/2001 | Fattouche et al. ............ 342/450 |
| 6,331,836 B1 | 12/2001 | Jandrell |
| 7,551,929 B2 | 6/2009 | Alizadeh-Shabdiz et al. |
| 8,040,240 B2 | 10/2011 | Khushu et al. |
| 2003/0151547 A1 * | 8/2003 | Mauro et al. ............ 342/357.15 |
| 2009/0149202 A1 * | 6/2009 | Hill et al. ............ 455/456.6 |

FOREIGN PATENT DOCUMENTS

| | | |
|---|---|---|
| JP | 2001028576 A | 1/2001 |
| JP | 2002512373 A | 4/2002 |
| JP | 2002171214 A | 6/2002 |
| JP | 2005531985 A | 10/2005 |
| JP | 2006345427 A | 12/2006 |
| JP | 2008008843 A | 1/2008 |
| RU | 2158935 C2 | 11/2000 |
| RU | 2195772 | 12/2002 |
| RU | 2320083 C2 | 3/2008 |
| WO | WO9815070 | 4/1998 |
| WO | 9908463 A1 | 2/1999 |
| WO | WO2005008917 A1 | 1/2005 |
| WO | 2007048130 A2 | 4/2007 |

OTHER PUBLICATIONS

International Search Report and Written Opinion—PCT/US2009/046962, International Search Authority—European Patent Office—Sep. 1, 2009.

* cited by examiner

APPARATUS AND METHOD FOR MULTI-SECTOR VELOCITY MOBILE VELOCITY AND DOPPLER ESTIMATE FOR SYNCHRONOUS COMMUNICATION SYSTEMS

CLAIM OF PRIORITY UNDER 35 U.S.C. §119

The present application for patent claims priority to Provisional Application No. 61/060,703 entitled "Multi-Sector Mobile Velocity and Doppler Estimate for Synchronous Systems" filed Jun. 11, 2008, and assigned to the assignee hereof and hereby expressly incorporated by reference herein.

FIELD

This disclosure relates generally to apparatus and methods for velocity and Doppler frequency estimation. More particularly, the disclosure relates to multi-sector mobile velocity and Doppler estimation for synchronous communication systems.

BACKGROUND

Wireless communication systems provide a variety of communication services to mobile users that are away from the fixed telecommunications infrastructure or are moving. These wireless systems employ radio transmissions to interconnect mobile devices with various base stations in the service area. The base stations, in turn, are connected to mobile switching centers which route connections to and from the mobile devices to others on various communication networks such as the public switched telephony network (PSTN), Internet, etc. In this manner, users that are away from their fixed sites or are on the move may receive various communication services such as voice telephony, paging, messaging, email, data transfers, video, Web browsing, etc.

Due to the use of radio frequencies for wireless interconnection, all mobile users must agree on a common set of protocols to share the scarce radio spectrum allocated for wireless communication services. One important protocol relates to the access method used to connect multiple mobile devices to the wireless communication network. Various access methods include frequency division multiple access (FDMA), time division multiple access (TDMA), code division multiple access (CDMA), and orthogonal frequency division multiplex (OFDM).

SUMMARY

Disclosed are an apparatus and method for multi-sector mobile velocity and Doppler estimation for a wireless communication system in synchronous communication systems. According to one aspect, a method for estimating velocity and Doppler frequency in a wireless communication system, the method comprising using a receiver to acquire a first plurality of time-of-arrival (TOA) measurements from a first plurality of base stations at a first time; using the receiver to acquire a second plurality of time-of-arrival (TOA) measurements from a second plurality of base stations at a second time; using the receiver to acquire a third plurality of time-of-arrival (TOA) measurements from a third plurality of base stations at a third time; determining a plurality of line-of-sight (LOS) distance measurements using the first, second and third pluralities of TOA measurements; determining a plurality of velocity estimates and a plurality of angle of arrival (AOA) estimates, using the plurality of LOS distance measurements; determining a plurality of Doppler frequency estimates using the plurality of velocity estimates and the plurality of angle of arrival (AOA) estimates; and using a processor for determining an average Doppler frequency estimate over a plurality of sectors, wherein the first, second and third pluralities of TOA measurements are acquired over the plurality of sectors.

In another aspect, a mobile station comprising a processor and a memory, the memory containing program code executable by the processor for performing the following: using a receiver to acquire a first plurality of time-of-arrival (TOA) measurements from a first plurality of base stations at a first time; using the receiver to acquire a second plurality of time-of-arrival (TOA) measurements from a second plurality of base stations at a second time; using the receiver to acquire a third plurality of time-of-arrival (TOA) measurements from a third plurality of base stations at a third time; determining a plurality of line-of-sight (LOS) distance measurements using the first, second and third pluralities of TOA measurements; determining a plurality of velocity estimates and a plurality of angle of arrival (AOA) estimates, using the plurality of LOS distance measurements; determining a plurality of Doppler frequency estimates using the plurality of velocity estimates and the plurality of angle of arrival (AOA) estimates; and using a processor for determining an average Doppler frequency estimate over a plurality of sectors, wherein the first, second and third pluralities of TOA measurements are acquired over the plurality of sectors.

In another aspect, a mobile station for estimating velocity and Doppler frequency comprising means for acquiring a first plurality of time-of-arrival (TOA) measurements from a first plurality of base stations at a first time; means for acquiring a second plurality of time-of-arrival (TOA) measurements from a second plurality of base stations at a second time; means for acquiring a third plurality of time-of-arrival (TOA) measurements from a third plurality of base stations at a third time; means for determining a plurality of line-of-sight (LOS) distance measurements using the first, second and third pluralities of TOA measurements; means for determining a plurality of velocity estimates and a plurality of angle of arrival (AOA) estimates, using the plurality of LOS distance measurements; means for determining a plurality of Doppler frequency estimates using the plurality of velocity estimates and the plurality of angle of arrival (AOA) estimates; and means for determining an average Doppler frequency estimate over a plurality of sectors, wherein the first, second and third pluralities of TOA measurements are acquired over the plurality of sectors.

In another aspect, a computer-readable medium having a computer program comprising instructions, which when executed by at least one processor, operates to estimate velocity and Doppler frequency, the computer program comprising: instructions for acquiring a first plurality of time-of-arrival (TOA) measurements from a first plurality of base stations at a first time; instructions for acquiring a second plurality of time-of-arrival (TOA) measurements from a second plurality of base stations at a second time; instructions for acquiring a third plurality of time-of-arrival (TOA) measurements from a third plurality of base stations at a third time; instructions for determining a plurality of line-of-sight (LOS) distance measurements using the first, second and third pluralities of TOA measurements; instructions for determining a plurality of velocity estimates and a plurality of angle of arrival (AOA) estimates, using the plurality of LOS distance measurements; instructions for determining a plurality of Doppler frequency estimates using the plurality of velocity estimates and the plurality of angle of arrival (AOA) estimates; and instructions for determining an average Doppler frequency estimate over a plurality of sectors, wherein the first, second and third pluralities of TOA measurements are acquired over the plurality of sectors.

Advantages of the present disclosure may include (1) better accuracy and reliability for mobile station velocity estimate leveraging availability of signal from multiple base stations, (2) better accuracy and reliability for mobile station Doppler frequency estimate derived from mobile station velocity estimate, (3) better performance for aspects of system operation depending on knowledge of mobile velocity or Doppler frequency, and (4) very low additional complexity leveraging typical existing forward link time tracking mechanism in mobile station.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
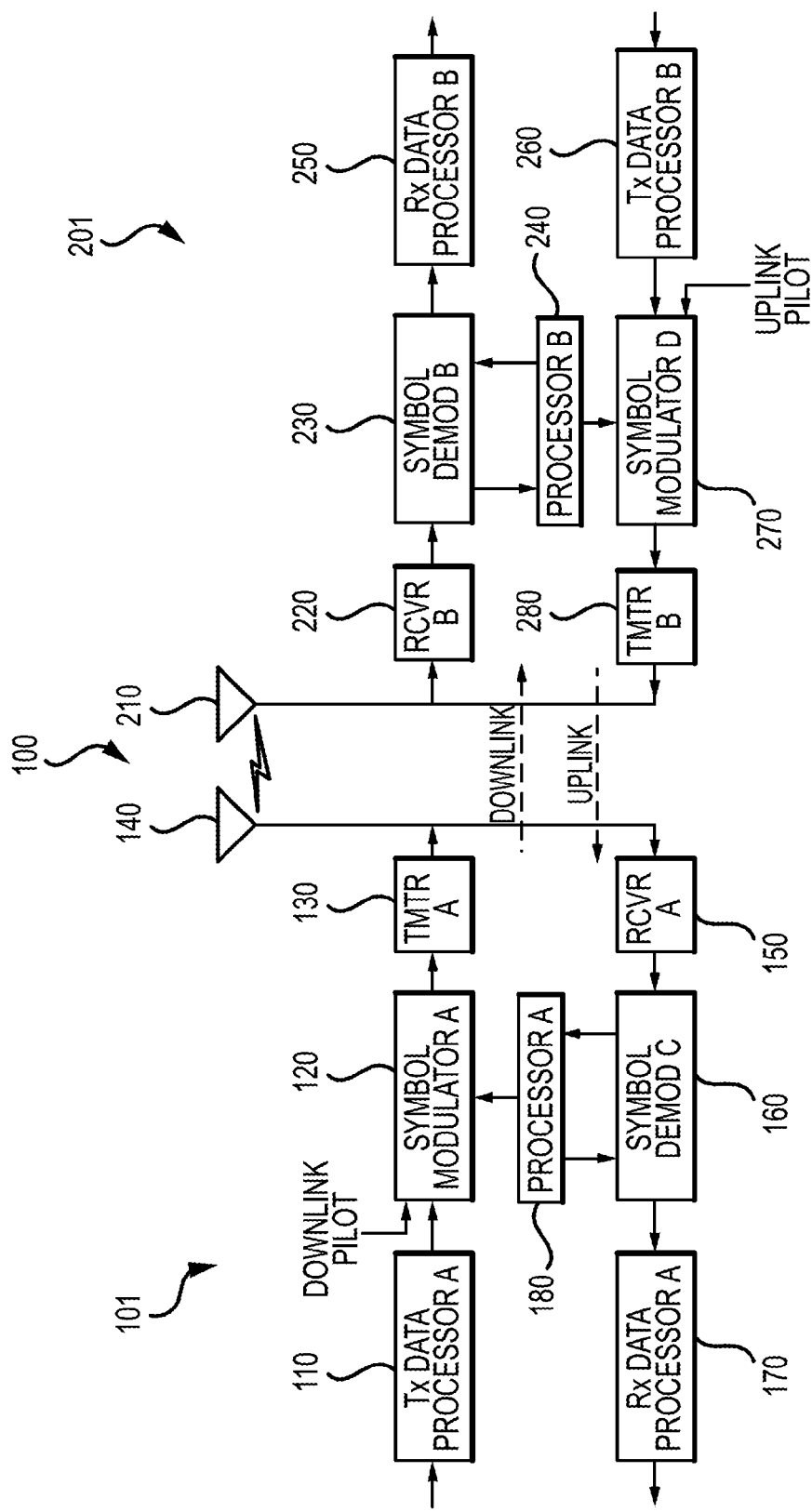
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device or mobile station). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
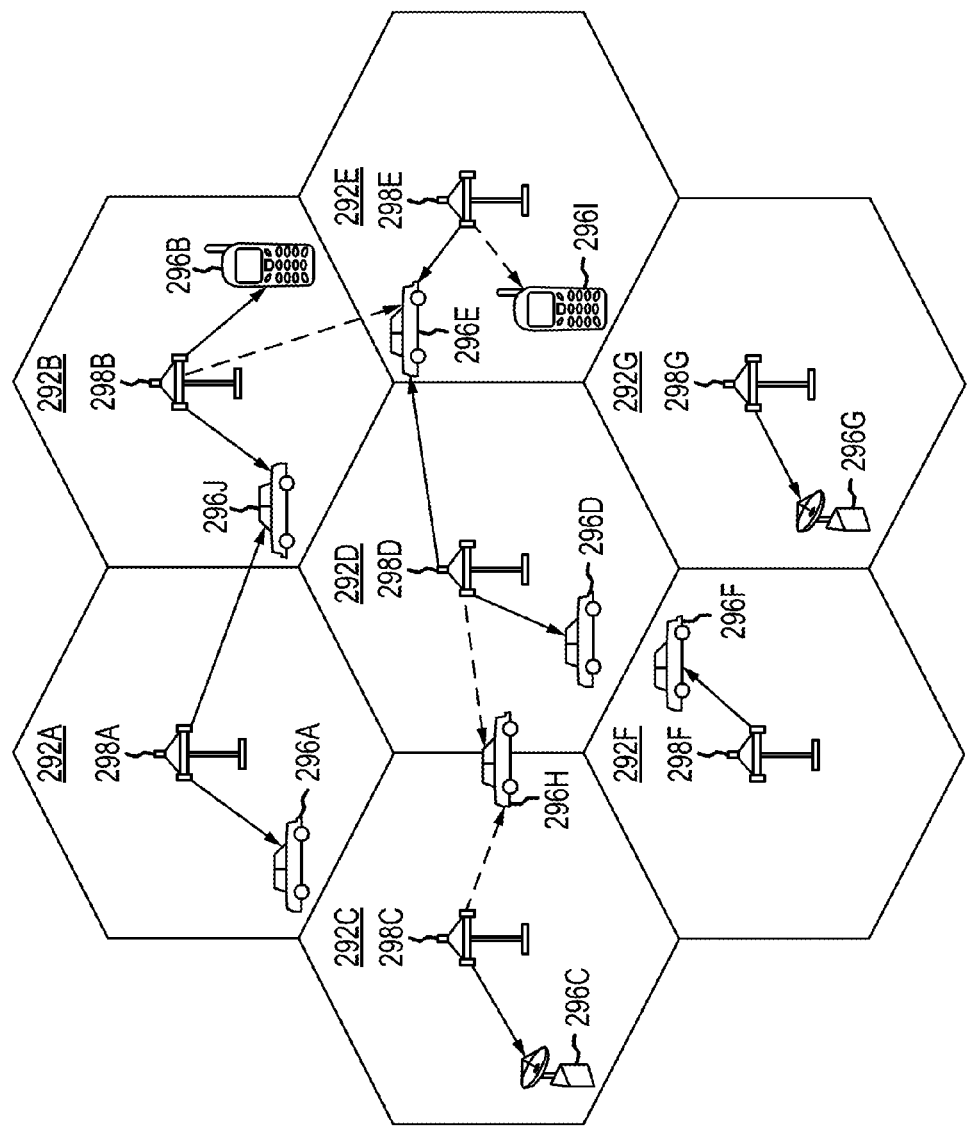
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively. Inter-system (i.e., inter-radio access technology (IRAT) transition) handover occurs when an ongoing call is transitioned between a cell of one network and a cell of another network. Such a transition may occur, for example, between a WCDMA site and a GSM site.

Mobile station velocity and Doppler frequency estimation is important for improved wireless system performance in many aspects including data demodulation, handoff optimization, power control, etc.

Conventional receiver designs for velocity and Doppler frequency estimation are based on signals from single or individual base stations, and therefore limited in performance especially when mobile station is in fading or at cell edge when serving sector signal quality is at its worst. For example, these prior methods of estimating mobile velocity included one or more of (1) determining a maximum Doppler frequency estimate, which is known to not be reliable when the mobile station is in a fading environment, (2) monitoring the rate of diversity switching, which relies on having a priori knowledge of the fading distribution, (3) observing received signal strength deviation, which is sensitive to inter-symbol interference unless computationally intensive multi-dimensional statistical analysis is used, and (4) using other methods based on level crossing rate, channel response auto-correlation, wavelet analysis, etc.

Although conventional wireless communication receivers have attempted to employ diversity combining of multi-path signals for data demodulation, but not for time tracking or mobile station velocity and Doppler frequency estimation. This shortfall has limited accuracy and reliability limitations using signals only from a single sector. All of the above prior methods are based on a signal from single or individual base stations, and therefore have performance limitations especially when the mobile station is in fading conditions or at the edge of a cell when the serving sector signal quality is at its worst.

The present disclosure attempts to enhance accuracy and reliability of mobile station velocity and Doppler frequency estimate, and associated aspects of system performance, with signals from multiple sectors. The present disclosure discloses a multi-sector approach that includes one or more of the following: (1) using diversity combining as common practice wherever possible in a mobile wireless communication receiver design for performance and for estimation of mobile station velocity and Doppler; (2) using signal time-of-arrival (TOA) data observed by mobile stations over time from multiple sectors; (3) incorporating knowledge of forward link signal transmission time at synchronous base stations, and therefore distance between mobile station and base stations are estimated through multi-sector time tracking; (4) estimating mobile station velocity from continuous observation of distance between a mobile station and a base station; (5) estimating mobile station velocity from signals of different sectors and combining these signals across sectors for better accuracy and reliability; and (6) measuring a forward link signal angle-of-arrival (AOA) at a mobile station from individual base stations, and deriving a Doppler frequency for each of the individual base stations with the same accuracy and reliability as that of the mobile station velocity estimate.

As described in the present disclosure, the multi-sector velocity ad Doppler frequency estimation approach enhances accuracy and reliability of mobile station velocity and Doppler frequency estimation, and associated aspects of system performance, using signals from multiple sectors without requiring additional equipment, such as, for example, a Global Positioning System (GPS) receiver, or signaling overhead, or an increase in computational complexity. This estimation approach in the present disclosure leverages signals from multiple sectors for joint estimation of mobile velocity and Doppler frequency to avoid limitations on accuracy and reliability for mobile station velocity and Doppler frequency estimates using a signal from single or individual sectors.

In one aspect, mobile station velocity observations based on arrival time or other signal parameters from multiple surrounding base stations to a mobile station are not mutually independent.

Figure 3:
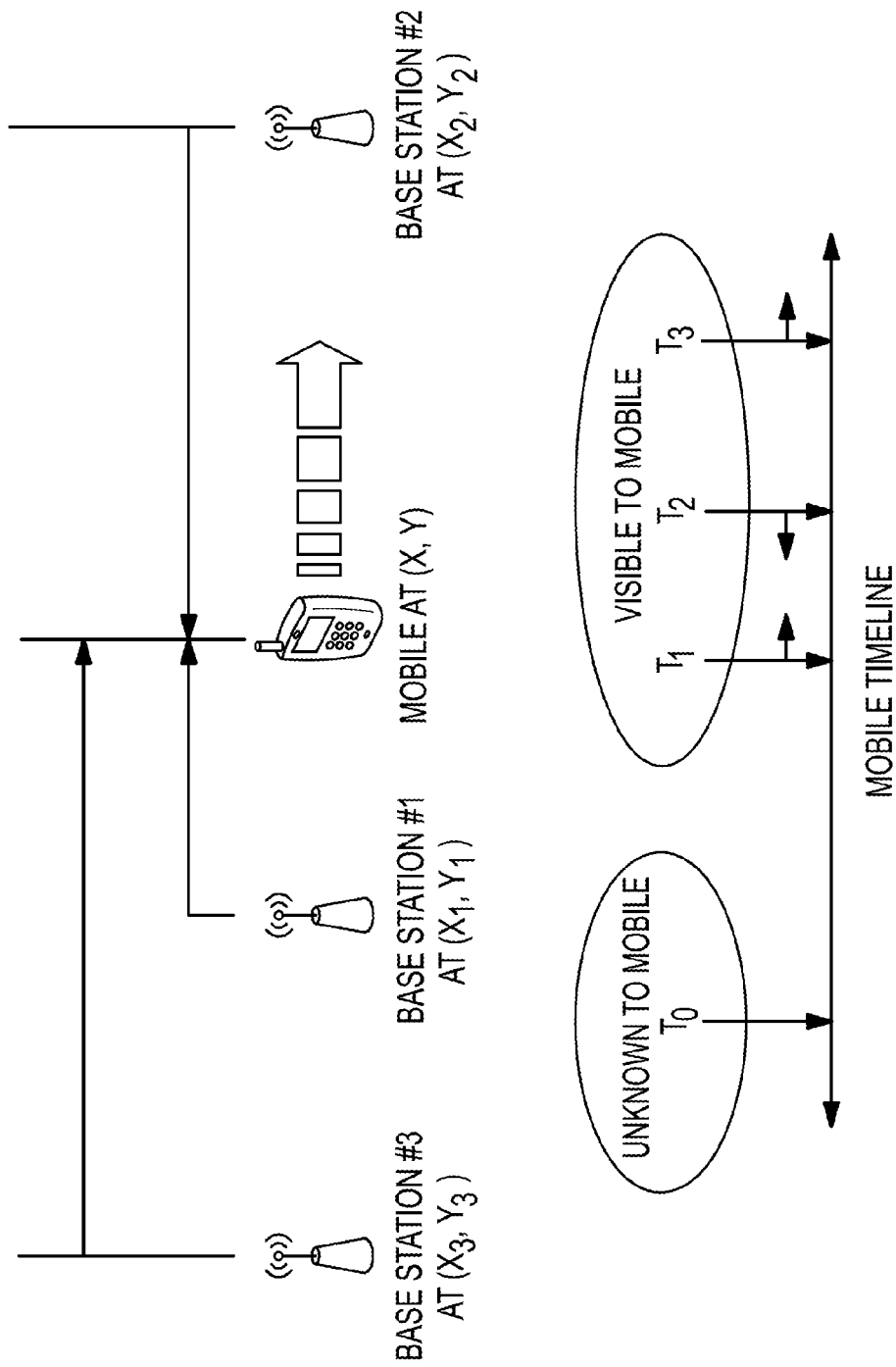
FIG. 3 illustrates an example of a signal arrival time correlation for a one-dimensional (1-D) geographical scenario.

FIG. 3 illustrates an example of a signal arrival time correlation for a one-dimensional (1-D) geographical scenario. The example one dimensional (1-D) geographical scenario in FIG. 3 demonstrates the measurement correlation.

For example, as the mobile station moves toward base station #2, signal arrival times $T_1$, $T_2$ and $T_3$ change by the same magnitude, while the changes in sign are known from continuous observation. Inaccuracy in determining the magnitude of $T_1$, $T_2$ and $T_3$ can easily be reduced by averaging across all three measurements, for example, using signal strength weighting for increased accuracy. In the worst case when the serving sector is temporarily invisible from the mobile station due to signal shadowing, its signal arrival time can still be estimated by referencing the signal arrival times of other sectors.

Figure 4:
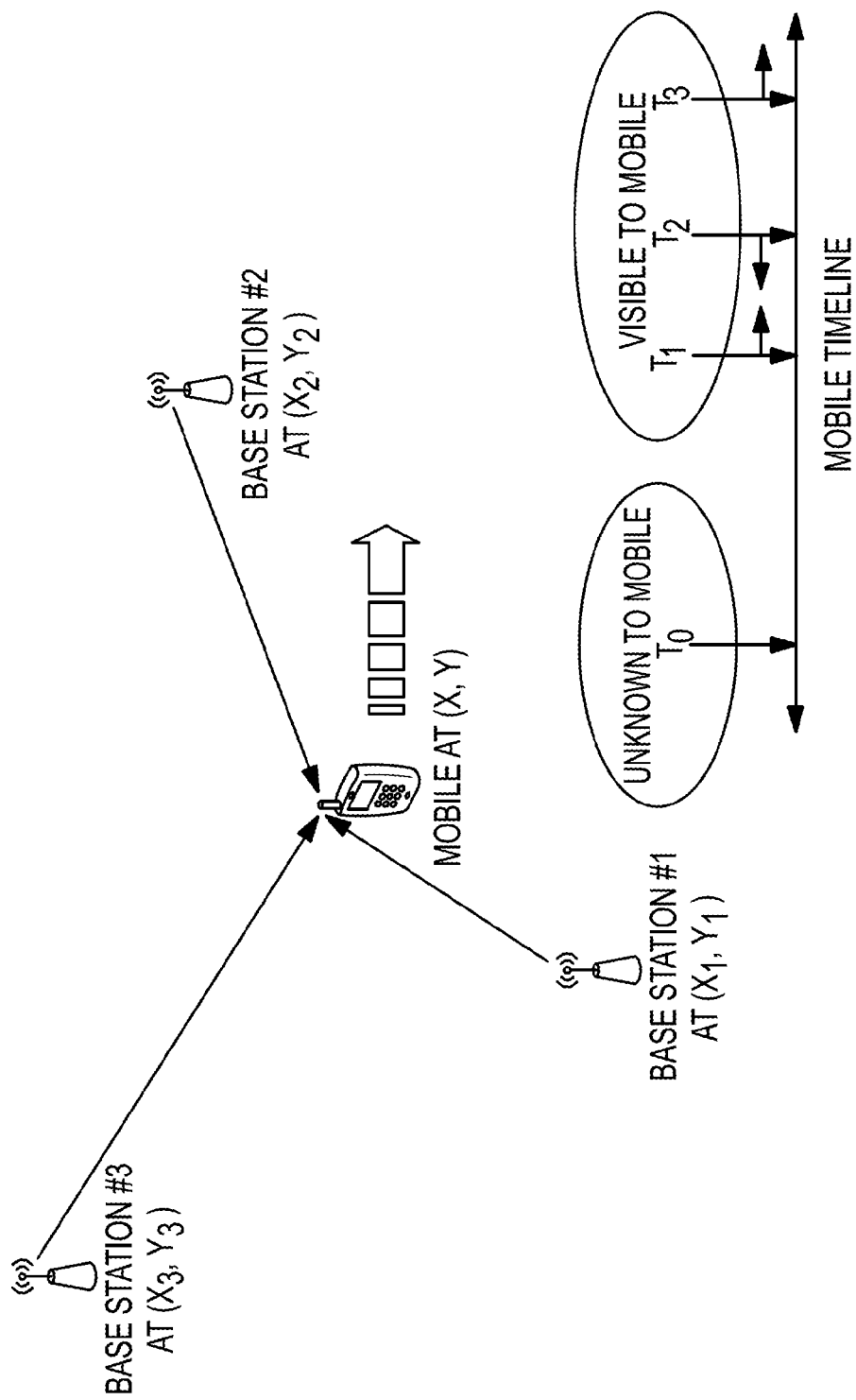
FIG. 4 illustrates an example of a signal arrival time correlation for a two-dimensional (2-D) geographical scenario.

FIG. 4 illustrates an example of a signal arrival time correlation for a two-dimensional (2-D) geographical scenario. The signal arrival time correlation from multiple surrounding base stations is not as obvious going from the simplified 1-D scenario to a more realistic two dimensional (2-D) scenario as shown in FIG. 4. Unlike the 1-D example, the measured signal arrival times from multiple base stations in the 2-D scenario are not as easily combined by mobile receivers for better accuracy. The difficulty is that the signal arrival times only provide a mobile receiver a one-dimensional view of a two-dimensional situation.

Figure 5:
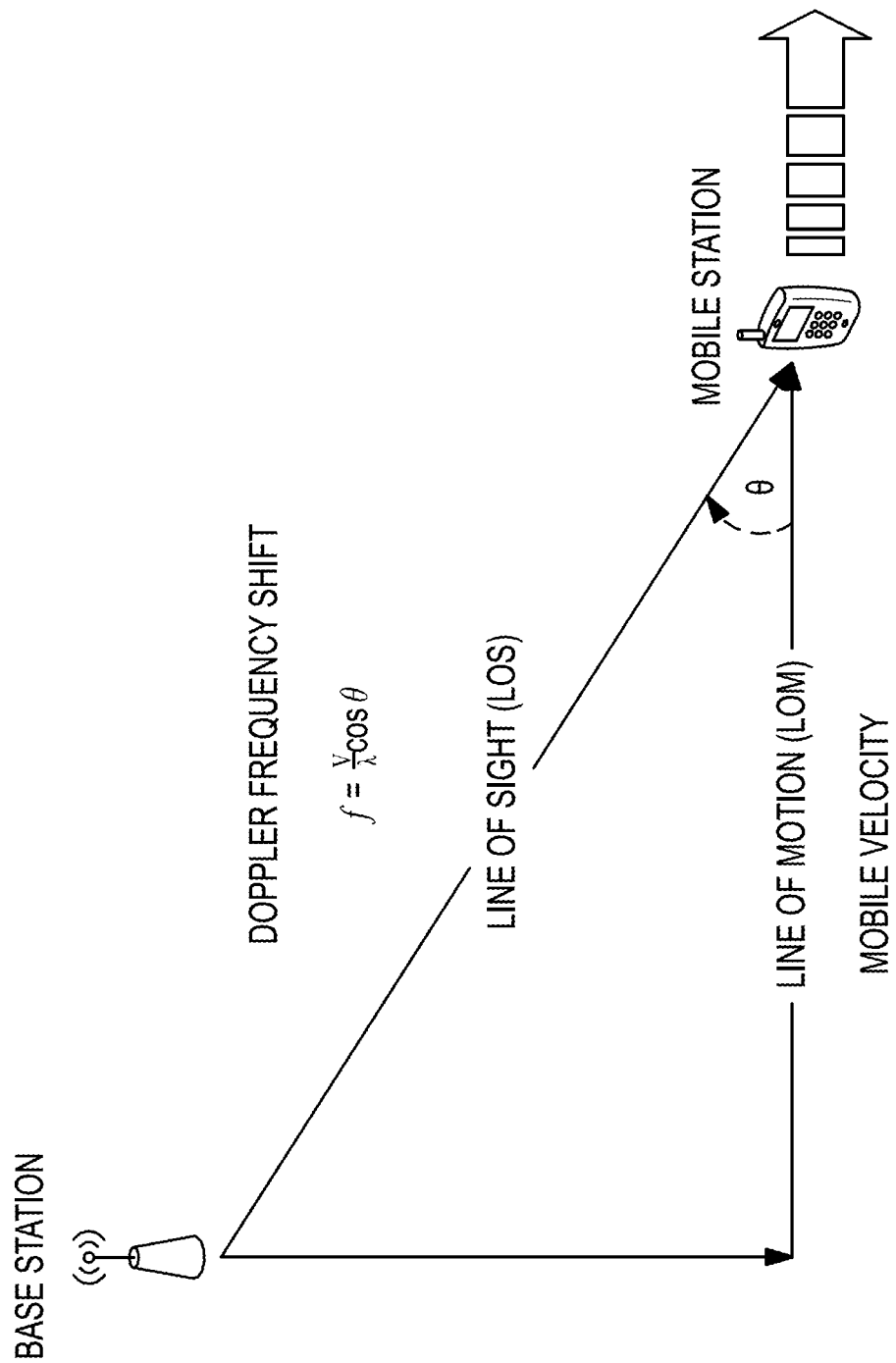
FIG. 5 illustrates an example of a Line-Of-Sight (LOS) versus Line-Of-Motion (LOM) scenario.

FIG. 5 illustrates an example of a Line-Of-Sight (LOS) versus Line-Of-Motion (LOM) scenario. The single sector signal analysis results fundamentally in Line-Of-Sight (LOS) properties such as Doppler frequency, and not Line-Of-Motion (LOM) properties such as mobile station velocity, differing by an angle-of-arrival (AOA) θ as shown in FIG. 5, unless sufficient receiver antenna diversity is employed at the mobile station. LOS properties are typically specific to the observed sector, while LOM properties have the advantage that they may be common across sectors which allows signal combining for better accuracy and reliability.

The multi-sector velocity and Doppler frequency estimation approach includes these two steps: (1) estimating LOM properties by taking advantage of signals from multiple surrounding sectors for better accuracy and reliability and (2) deriving LOS properties from more accurately estimated LOM properties for mobile wireless system performance improvements including data demodulation, power control, handoff reduction, etc. It is highly desirable and possible for the accuracy and reliability of mobile station velocity and Doppler estimates to exceed the artificial bound of single sector signal quality based on the joint upper bound set by multiple surrounding sectors visible to mobile stations.

In one aspect, the multi-sector velocity and Doppler frequency estimation approach includes one or more of the following: (1) diversity combining in estimation of mobile station velocity and Doppler frequency, (2) observation of signal time-of-arrival (TOA) by mobile stations over time from multiple sectors, (3) multi-sector time tracking of forward link signal transmission time at synchronous base stations to estimate distance, (4) continuous observation of distance between mobile station and base station for estimation of mobile velocity, (5) combination of mobile station velocity estimates from signals of different sectors for better accuracy and reliability, and (6) angle of arrival (AOA) measurements of forward link signal at the mobile station from individual base stations to derive the Doppler frequency with same accuracy and reliability as that of mobile station velocity estimate.

In one aspect, the forward link signal TOA measurements at a mobile station from different base stations are not independent. For the simplified 1-D scenario with three sectors as shown in FIG. 3, the constraint among $T_1$, $T_2$, and $T_3$ is as shown in Equation 1. The sign for $\Delta T_1$, $\Delta T_2$, and $\Delta T_3$ can be determined by continuous observation.

$$|\Delta T_1|=|\Delta T_2|=|\Delta T_3| \quad (1)$$

Going from the 1-D scenario to the 2-D scenario, the constraint, is shown in Equation 2.

$$\beta_{jk} = \frac{\Delta D_j^2(X,Y) - \Delta D_i^2(X,Y)}{\Delta D_k^2(X,Y) - \Delta D_i^2(X,Y)} \quad (2)$$
$$= \frac{(a_j - a_i)\Delta X}{(a_k - a_i)\Delta X}$$
$$= \frac{(a_j - a_i)}{(a_k - a_i)}$$
$$= \text{Constant}$$

where $$D_i^2(X,Y)=(X-X_i)^2+(Y-Y_i)^2=X^2+a_rX+b_i \quad (3)$$

The constraint shown in Equation 2 allows a common reference, the forward link transmit time for synchronous communication deployment, across base stations to be constantly calibrated with signals from multiple surrounding base stations visible to mobile station, thus not relying on signal quality from any single base station.

The implication given availability of synchronous communication forward link transmit time at base stations, along with TOA measurements already being estimated at the mobile station for time tracking, is that the LOS distances between the mobile station and individual base stations can be calculated using Equation 4, where c is the electromagnetic wave speed and $T_i$ and $T_0$ are time measurements.

$$D_i = c(T_i - T_0) \quad (4)$$

Figure 6:
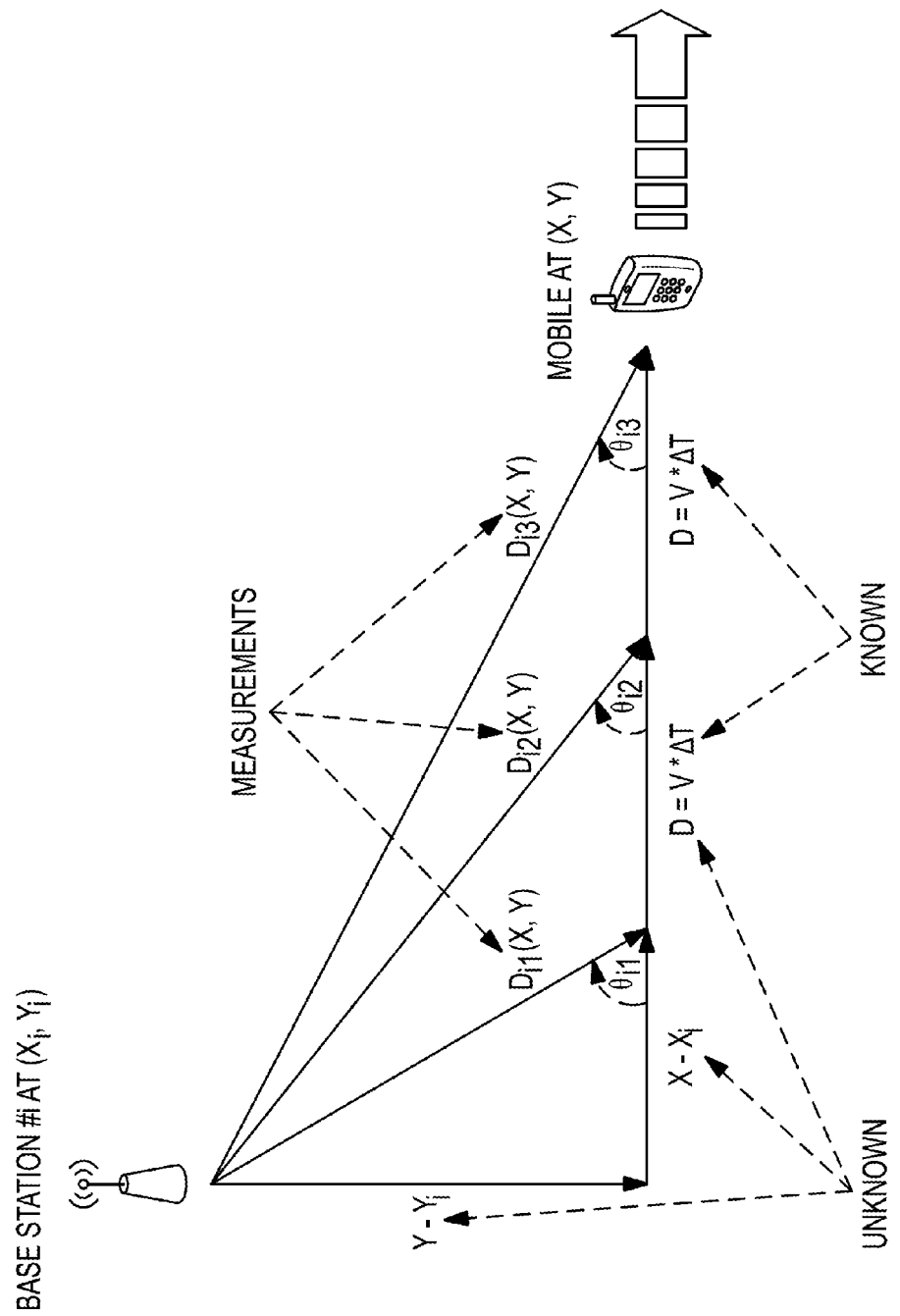
FIG. 6 illustrates an example of a mobile station velocity and Doppler frequency estimation.

With periodic updates of LOS distances between the mobile station and individual base stations, the mobile station velocity and Doppler frequency can be continuously monitored as shown in FIG. 6. FIG. 6 illustrates an example of a mobile station velocity and Doppler frequency estimation using equations 5 through 9.

$$D^2(t) = Y^2 + X^2 \quad (5)$$

$$D^2(t+\Delta t) = Y^2 + (X+d)^2 = Y^2 + X^2 + 2dX + d^2 = D^2(t) + 2dX + d^2 \quad (6)$$

$$D^2(t+2\Delta t) = Y^2 + (X+2d)^2 = Y^2 + X^2 + 4dX + 4d^2 = D^2(t) + 4dX + 4d^2 \quad (7)$$

$$D^2(t+2\Delta t) - 2D^2(t+\Delta t) = 2d^2 = 2(V\Delta t)^2 = 2V^2(\Delta t)^2 \quad (8)$$

$$V(t) = \sqrt{\frac{D^2(t+2\Delta t) - 2D^2(t+\Delta t)}{2(\Delta t)^2}} \quad (9)$$

Figure 7:
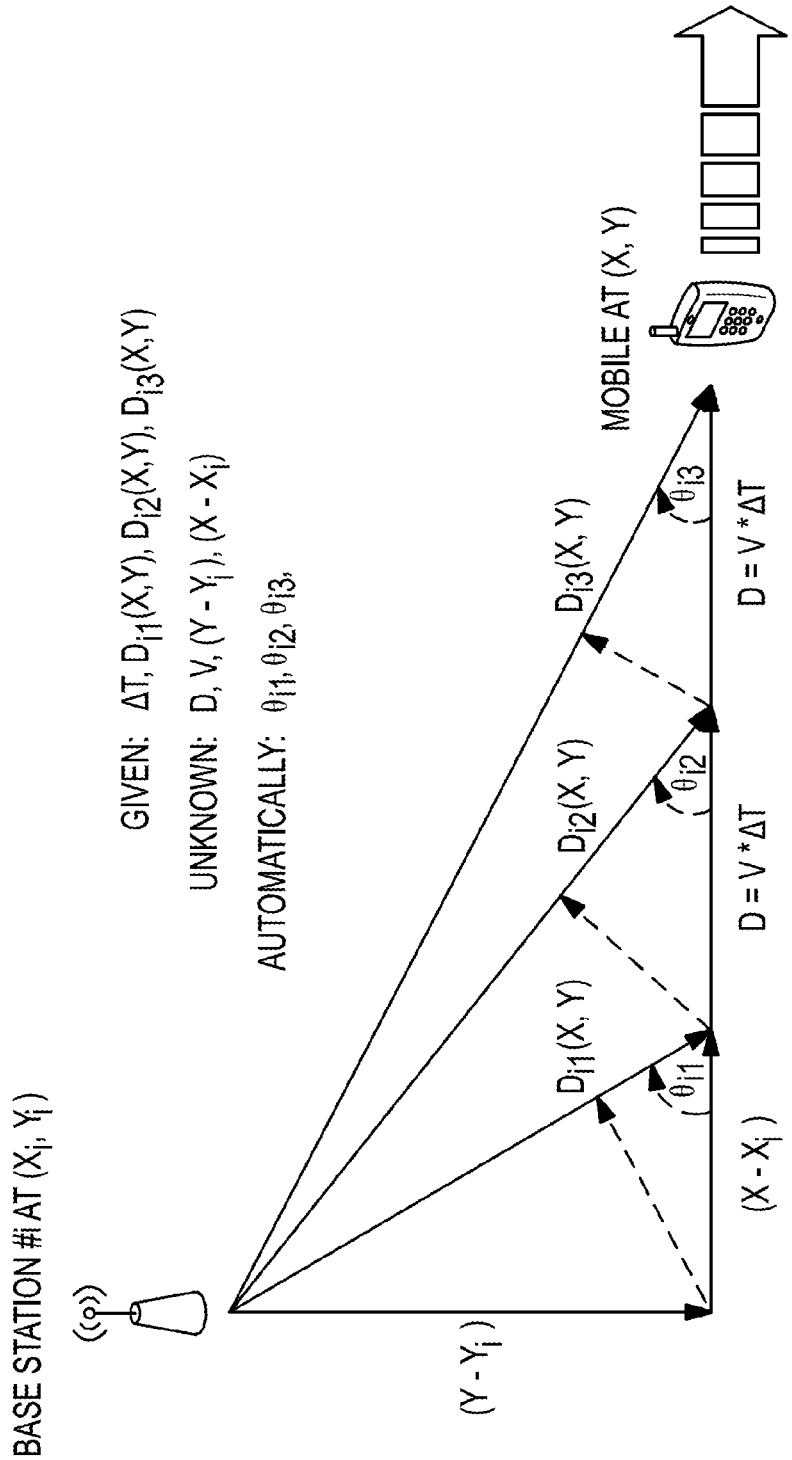
FIG. 7 illustrates an example of Angle of Arrival (AOA) from individual base stations.

As shown above in Equations 5 through 9, every three consecutive measurements of LOS distance between the mobile station and individual base stations yield an estimate of mobile station velocity which is supposed to be the same across base stations. In equations 5 through 9, $\Delta t$ is the next time increment from time t, and D is the LOS distance measurement. However, the AOA measurements will be different for individual base stations, and will be varying when the mobile station moves, as shown in FIG. 7. FIG. 7 illustrates an example of Angle of Arrival (AOA) from individual base stations. And, the AOA measurements can be further derived using Equations 10 through 12.

$$4D^2(t+\Delta t) - D^2(t+2\Delta t) = 4dX = 4VX\Delta t \quad (10)$$

$$X(t) = \frac{4D^2(t+\Delta t) - D^2(t+2\Delta t)}{4V\Delta t} \quad (11)$$

$$\cos(\theta(t)) = \frac{X(t)}{D(t)} = \frac{4D^2(t+\Delta t) - D^2(t+2\Delta t)}{4VD(t)\Delta t} \quad (12)$$

The resultant Doppler frequency estimate is then shown in Equation 13.

$$f(t) = \frac{V(t)}{\lambda} \cos(\theta)$$

$$= \frac{1}{\lambda} \sqrt{\frac{D^2(t+2\Delta t) - 2D^2(t+\Delta t)}{2(\Delta t)^2}} \frac{4D^2(t+\Delta t) - D^2(t+2\Delta t)}{4VD(t)\Delta t} \quad (13)$$

And similarly, in equations 10 through 13, $\Delta t$ is the next time increment from time t, and D is the LOS distance measurement. And, $\lambda$ is the wavelength of the transmitted signal.

Figure 8:
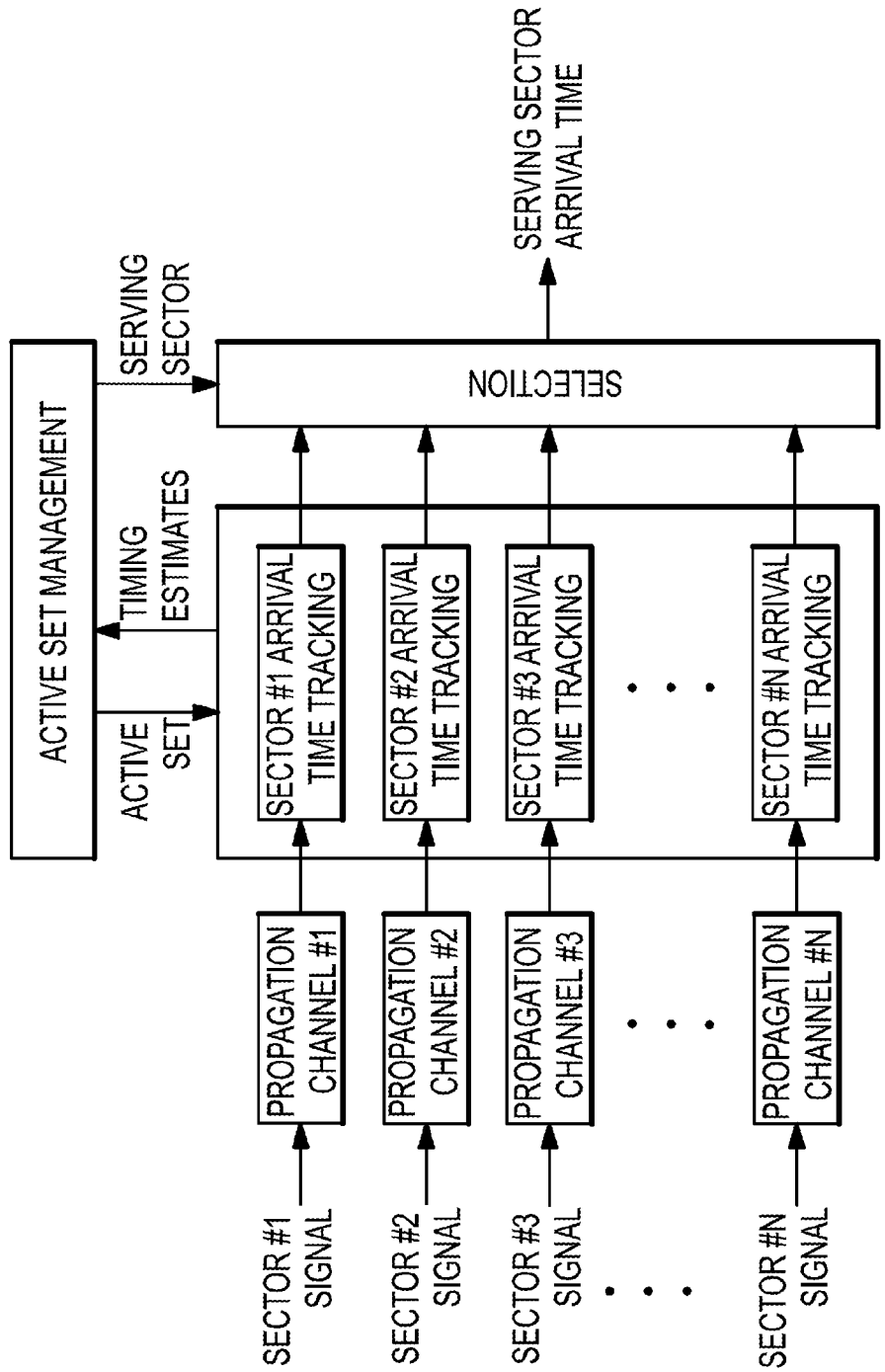
FIG. 8 illustrates an example of a multi-sector time tracking architecture.
Figure 9:
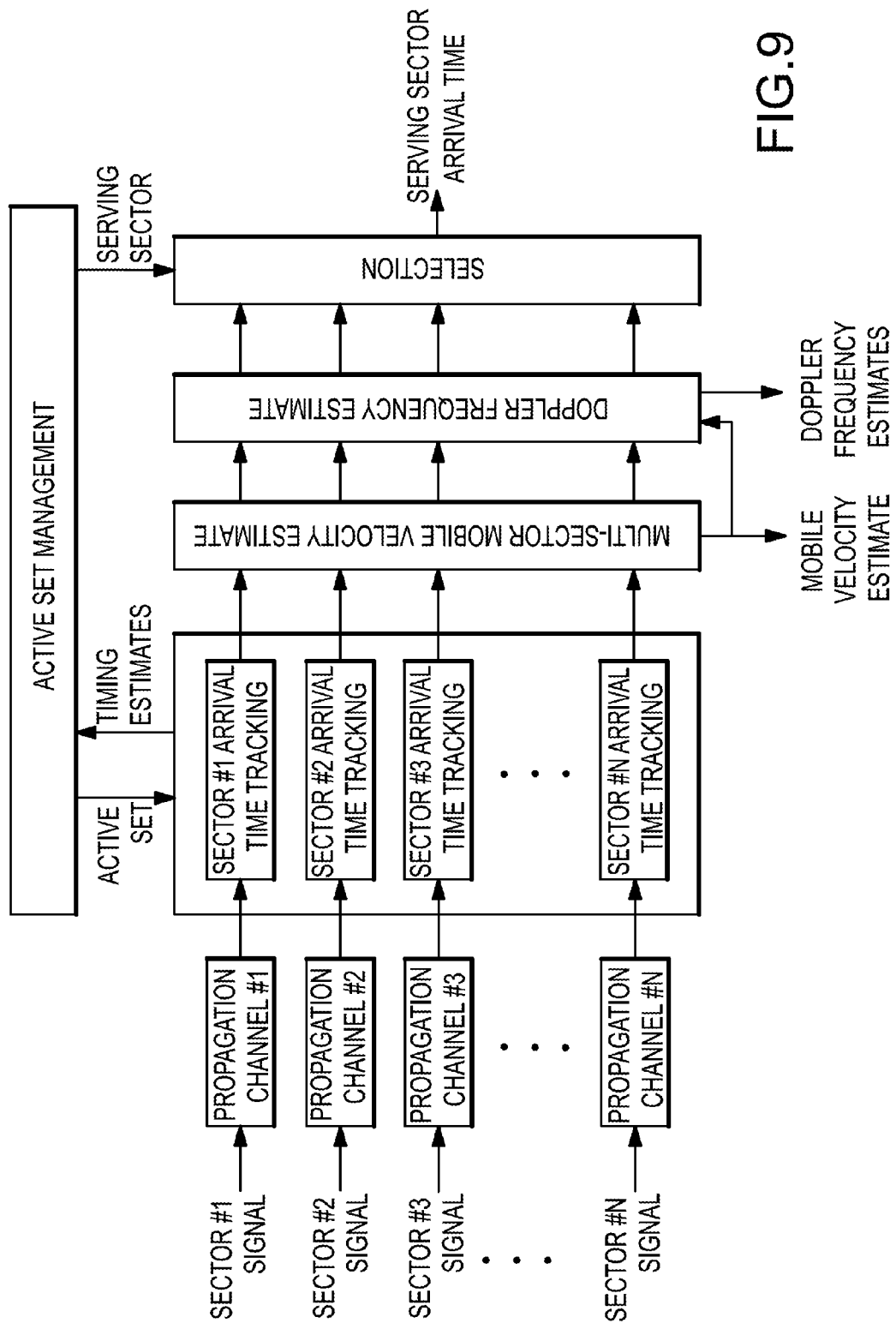
FIG. 9 illustrates an example of a multi-sector mobile station velocity and Doppler frequency estimation architecture.

The advantages of the multi-sector approach for mobile station velocity and Doppler frequency estimation in synchronous communication systems include (1) better accuracy and reliability for mobile station velocity estimate by leveraging availability of signal from multiple base stations, (2) better accuracy and reliability for mobile station Doppler frequency estimate derived from the mobile station velocity estimate, (3) better performance for system operation aspects depending on knowledge of mobile velocity or Doppler frequency, and (4) very low additional complexity by leveraging typical existing forward link time tracking mechanisms in mobile station which can be shown in the comparison between FIGS. 8 and 9. FIG. 8 illustrates an example of a multi-sector time tracking architecture. FIG. 9 illustrates an example of a multi-sector mobile station velocity and Doppler frequency estimation architecture.

One skilled in the art would understand that the multi-sector mobile velocity and Doppler frequency estimation approach as disclosed herein and its implementations can be applied to any synchronous wireless mobile communication systems, for example and not limited to, an Ultra Mobile Broadband (UMB) system.

Figure 10:
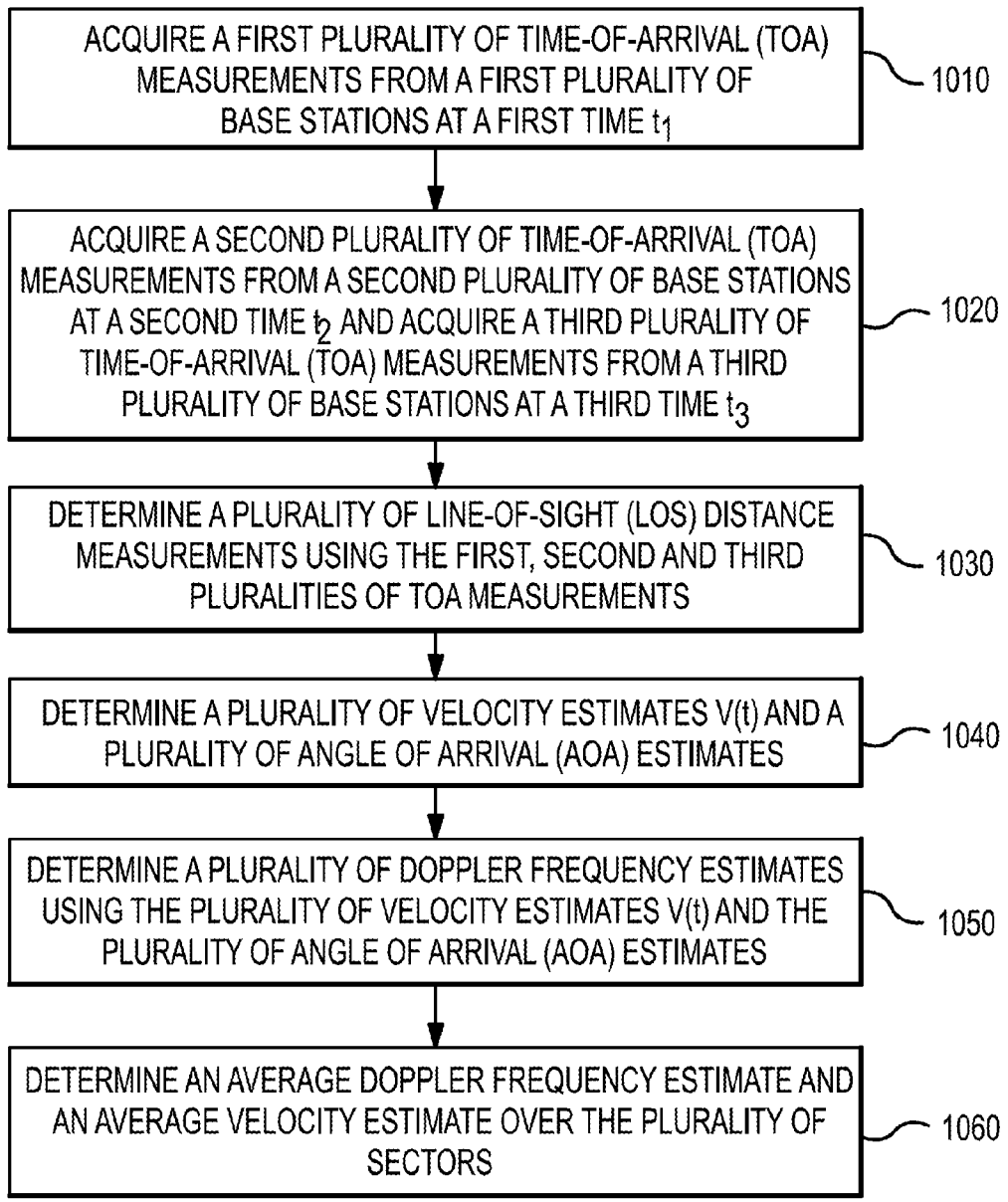
FIG. 10 illustrates an example flow diagram for multi-sector velocity and Doppler frequency estimation.

FIG. 10 illustrates an example flow diagram for multi-sector velocity and Doppler frequency estimation. In block 1010, acquire a first plurality of time-of-arrival (TOA) measurements from a first plurality of base stations at a first time $t_1$. The time-of-arrival (TOA) measurements are forward link signal time-of-arrival (TOA) measurements wherein forward link denotes a direction from a base station to a mobile station. In one example, a receiver (such as the receiver 220 of FIG. 1) is used to acquire the TOA measurements. The first plurality of base stations comprises at least two base stations. In one aspect, the base stations are synchronous with each other. In one aspect, the time-of-arrival (TOA) measurements are synchronous and are derived from a Global Positioning System (GPS). In one aspect, the TOA measurements are acquired from a plurality of sectors.

Following block 1010, in block 1020, acquire a second plurality of time-of-arrival (TOA) measurements from a second plurality of base stations at a second time $t_2$ different from the first time $t_1$, and acquire a third plurality of time-of-arrival (TOA) measurements from a third plurality of base stations at a third time $t_3$ different from the second time $t_2$ and the first time $t_1$. In one example, a receiver (such as the receiver 220 of FIG. 1) is used to acquire the TOA measurements. The time-of-arrival (TOA) measurements are forward link signal time-of-arrival (TOA) measurements wherein forward link denotes a direction from a base station to a mobile station. In one aspect, the second and third pluralities of base stations comprise base stations different from the base stations in the first plurality of base stations. In another aspect, the first, second and third pluralities of base stations are the same. In one aspect, the base stations are synchronous with each other. In one aspect, the time-of-arrival (TOA) measurements are synchronous and are derived from GPS. In one aspect, the TOA measurements are acquired from a plurality of sectors. One skilled in the art would understand that the step in block 1020 can be repeated at additional different times (e.g., $t_4$, $t_5$, $t_6$, etc.) to obtain additional TOA measurements from additional base stations.

Following block 1020, in block 1030, determine a plurality of line-of-sight (LOS) distance measurements using the first, second and third pluralities of TOA measurements. In one aspect, the plurality of LOS distance measurements is determined using $D_i = c(T_1 - T_0)$ where c is the electromagnetic wave speed and $T_i$ is one of the time $t_1$, $t_2$ or $t_3$, and $T_0$ corresponds to the transmission time. In one aspect, the plurality of LOS distance measurements is representative of at least two different sectors.

Following block 1030, in block 1040, determine a plurality of velocity estimates V(t) and a plurality of angle of arrival (AOA) estimates, using the plurality of LOS distance measurements. In one aspect, an velocity estimate is determined using:

$$V(t) = \sqrt{\frac{D^2(t+2\Delta t) - 2D^2(t+\Delta t)}{2(\Delta t)^2}}$$

where $\Delta t$ is the next time increment from time t, and D is a LOS distance measurement. In one aspect, an angle of arrival (AOA) estimate is determined using:

$$\cos(\theta(t)) = \frac{X(t)}{D(t)} = \frac{4D^2(t+\Delta t) - D^2(t+2\Delta t)}{4VD(t)\Delta t}$$

And similarly, $\Delta t$ is the next time increment from time t, and D is a LOS distance measurement. X(t) is the x-axis shown in FIG. 6. The plurality of velocity estimates V(t) is representative of at least two different sectors. The plurality of angle of arrival (AOA) estimates is representative of at least two different sectors.

Following block 1040, in block 1050, determine a plurality of Doppler frequency estimates using the plurality of velocity estimates V(t) and the plurality of angle of arrival (AOA) estimates. One skilled in the art would understand that the Doppler frequency estimates is determined for the plurality of sectors using the corresponding plurality of velocity estimates V(t) and the plurality of angle of arrival (AOA) estimates. In one aspect, a Doppler frequency estimate is determined using:

$$f(t) = \frac{V(t)}{\lambda}\cos(\theta)$$
$$= \frac{1}{\lambda}\sqrt{\frac{D^2(t+2\Delta t) - 2D^2(t+\Delta t)}{2(\Delta t)^2}} \frac{4D^2(t+\Delta t) - D^2(t+2\Delta t)}{4VD(t)\Delta t}$$

where $\Delta t$ is the next time increment from time t, D is the LOS distance measurement, and $\lambda$ is the wavelength of the transmitted signal.

Following block 1050, in block 1060, determine an average Doppler frequency estimate and an average velocity estimate over the plurality of sectors. In one example, the averaging is performed by a processor, such as the Rx Data processor 250 shown in FIG. 1. In one aspect, the averaging is weighted. In one aspect, the weighting includes using weighting factors that are based on signal strength of the received signals associated with the time of arrival (TOA) measurements. One skilled in the art would understand that the velocity and Doppler frequency estimation approach is application to any wireless communication system in a synchronous system. In one aspect, the wireless communication system employs one of the following access techniques: Time division multiple access (TDMA), frequency division multiple access (FDMA), code division multiple access (CDMA) or orthogonal frequency division multiple access (OFDMA).

One skilled in the art would understand that the steps disclosed in the example flow diagram in FIG. 10 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 11:
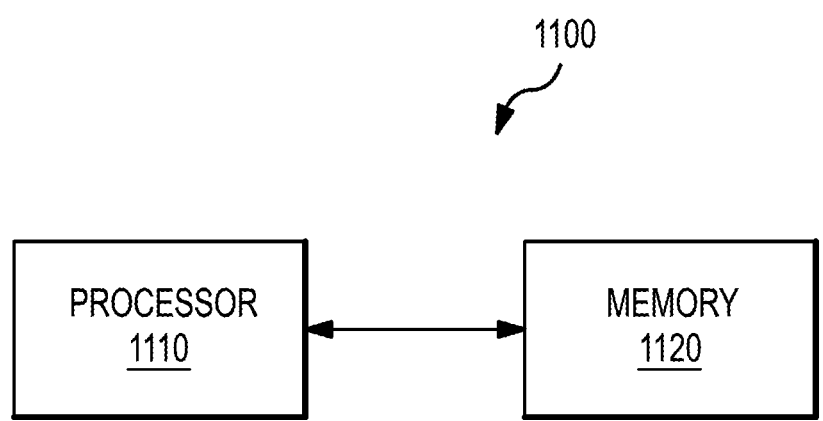
FIG. 11 illustrates an example of a device comprising a processor in communication with a memory for executing the processes for multi-sector velocity and Doppler frequency estimation.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for executing the processes for multi-sector velocity and Doppler frequency estimation. In one example, the device 1100 is used to implement the algorithm illustrated in FIG. 10. In one aspect, the memory 1120 is located within the processor 1110. In another aspect, the memory 1120 is external to the processor 1110. In one aspect, the processor includes circuitry for implementing or performing the various flow diagrams, logical blocks and/or modules described herein.

Figure 12:
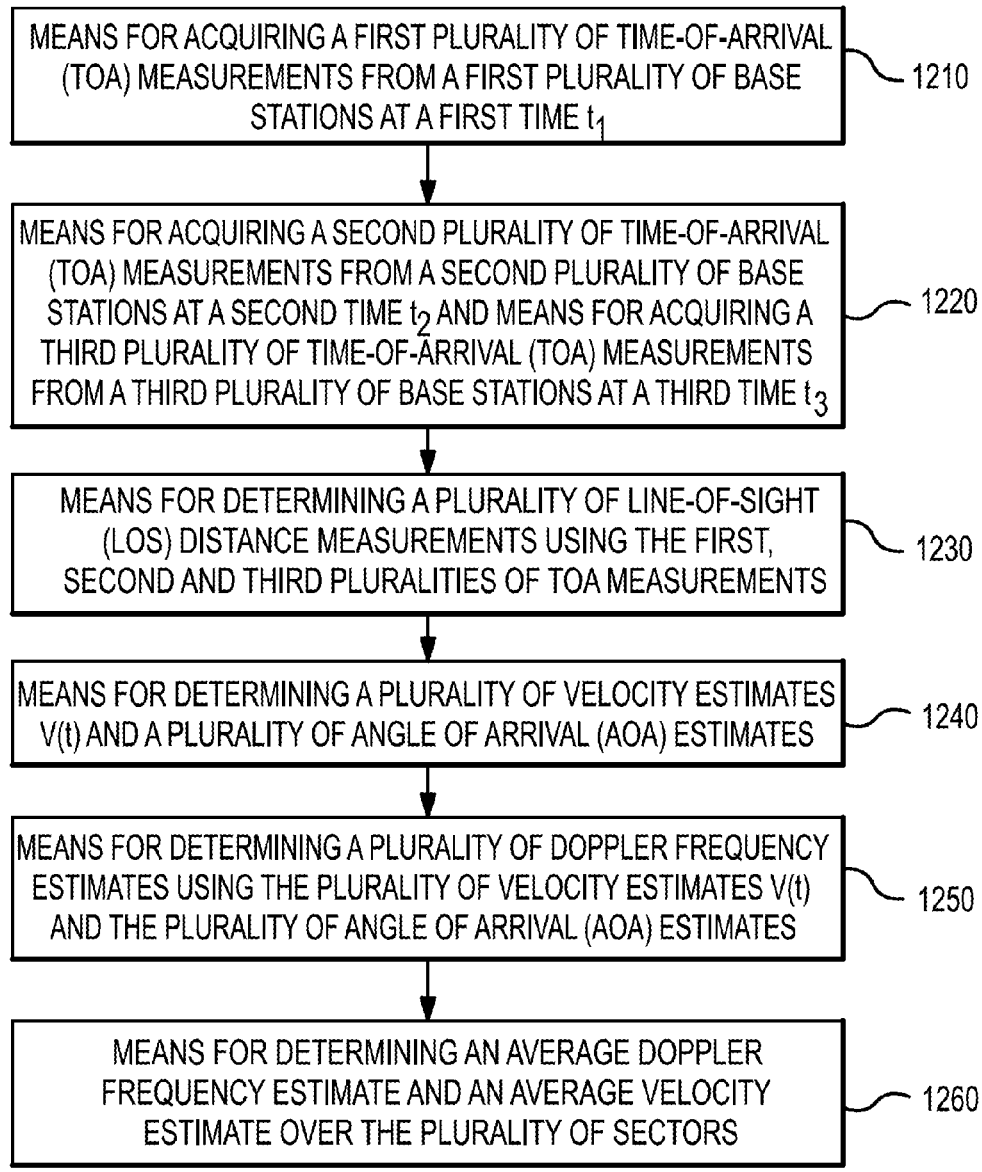
FIG. 12 illustrates an example of a device 1200 suitable for multi-sector velocity and Doppler frequency estimation.

FIG. 12 illustrates an example of a device 1200 suitable for multi-sector velocity and Doppler frequency estimation. In one aspect, the device 1200 is implemented by at least one processor comprising one or more modules configured to provide different aspects of multi-sector velocity and Doppler frequency estimation as described herein in blocks 1210, 1220, 1230, 1240, 1250 and 1260. For example, each module comprises hardware, firmware, software, or any combination thereof. In one aspect, the device 1200 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for estimating velocity and Doppler frequency in a wireless communication system, the method comprising:
   using a receiver to acquire a first plurality of time-of-arrival (TOA) of forward link signals measurements from a first plurality of base stations at a first time;
   using the receiver to acquire a second plurality of TOA measurements of forward link signals from a second plurality of base stations at a second time;
   using the receiver to acquire a third plurality of TOA measurements of forward link signals from a third plurality of base stations at a third time;
   determining a plurality of line-of-sight (LOS) distance measurements using the first, second and third pluralities of TOA measurements;
   determining a plurality of velocity estimates and a plurality of angle of arrival (AOA) estimates, using the plurality of LOS distance measurements;
   determining a plurality of Doppler frequency estimates using the plurality of velocity estimates and the plurality of AOA estimates; and
   using a processor for determining an average Doppler frequency estimate and an average velocity over a plurality of sectors based on corresponding weighting factors, wherein the first, second and third pluralities of TOA measurements are acquired over the plurality of sectors;
   wherein the first, second and third pluralities of TOA measurements are subject to a common constraint value based on which a forward link transmit time is constantly calibrated among the first, second and third pluralities of base stations; and
   wherein the first plurality of base stations does not include base stations of the second and third pluralities of base stations, the second plurality of base stations does not include base stations of the first and third pluralities of base stations and the third plurality of base stations does not include base stations of the first and second pluralities of base stations.

2. The method of claim 1 wherein the first, second and third pluralities of base stations are synchronous with each other.

3. The method of claim 2 wherein the first, second and third pluralities of TOA measurements are synchronous and are derived from a Global Positioning System (GPS).

4. The method of claim 1, wherein the weighting factors are based on signal strengths of the forward link signals from the first, second and third pluralities of base stations.

5. The method of claim 1 wherein the receiver and the processor are components of the wireless communication system.

6. The method of claim 5 wherein the wireless communication system uses one of the following multiple access techniques: Time division multiple access (TDMA), frequency division multiple access (FDMA), code division multiple access (CDMA) or orthogonal frequency division multiple access (OFDMA).

7. A mobile station comprising a processor and a memory, the memory containing program code executable by the processor for performing the following:
   using a receiver to acquire a first plurality of time-of-arrival (TOA) measurements of forward link signals from a first plurality of base stations at a first time;
   using the receiver to acquire a second plurality of TOA measurements of forward link signals from a second plurality of base stations at a second time;
   using the receiver to acquire a third plurality of TOA measurements of forward link signals from a third plurality of base stations at a third time;
   determining a plurality of line-of-sight (LOS) distance measurements using the first, second and third pluralities of TOA measurements;
   determining a plurality of velocity estimates and a plurality of angle of arrival (AOA) estimates, using the plurality of LOS distance measurements;
   determining a plurality of Doppler frequency estimates using the plurality of velocity estimates and the plurality of AOA estimates; and
   using a processor for determining an average Doppler frequency estimate and an average velocity over a plurality of sectors based on corresponding weighting factors, wherein the first, second and third pluralities of TOA measurements are acquired over the plurality of sectors;
   wherein the first, second and third pluralities of TOA measurements are subject to a common constraint value based on which a forward link transmit time is constantly calibrated among the first, second and third pluralities of base stations; and
   wherein the first plurality of base stations does not include base stations of the second and third pluralities of base stations, the second plurality of base stations does not include base stations of the first and third pluralities of base stations and the third plurality of base stations does not include base stations of the first and second pluralities of base stations.

8. The mobile station of claim 7 wherein the first, second and third pluralities of base stations are synchronous with each other.

9. The mobile station of claim 8 wherein the first, second and third pluralities of TOA measurements are synchronous and are derived from a Global Positioning System (GPS).

10. The mobile station of claim 7 wherein the weighting factors are based on signal strengths of the forward link signals from with the first, second and third pluralities of base stations.

11. The mobile station of claim 7 wherein the receiver and the processor are components of the mobile station.

12. The mobile station of claim 11 wherein one of the following multiple access techniques are employed in acquiring the first, second and third pluralities of TOA measurements: Time division multiple access (TDMA), frequency division multiple access (FDMA), code division multiple access (CDMA) or orthogonal frequency division multiple access (OFDMA).

13. A mobile station for estimating velocity and Doppler frequency comprising:
    means for acquiring a first plurality of time-of-arrival (TOA) measurements of a forward link signal from a first plurality of base stations at a first time;
    means for acquiring a second plurality of TOA measurements of forward link signals from a second plurality of base stations at a second time;
    means for acquiring a third plurality of TOA measurements of forward link signals from a third plurality of base stations at a third time;
    means for determining a plurality of line-of-sight (LOS) distance measurements using the first, second and third pluralities of TOA measurements;
    means for determining a plurality of velocity estimates and a plurality of angle of arrival (AOA) estimates, using the plurality of LOS distance measurements;
    means for determining a plurality of Doppler frequency estimates using the plurality of velocity estimates and the plurality of AOA estimates; and
    means for determining an average Doppler frequency estimate and an average velocity over a plurality of sectors based on corresponding weighting factors, wherein the first, second and third pluralities of TOA measurements are acquired over the plurality of sectors
    wherein the first, second and third pluralities of TOA measurements are subject to a common constraint value based on which a forward link transmit time is constantly calibrated among the first, second and third pluralities of base stations; and
    wherein the first plurality of base stations does not include base stations of the second and third pluralities of base stations, the second plurality of base stations does not include base stations of the first and third pluralities of base stations and the third plurality of base stations does not include base stations of the first and second pluralities of base stations.

14. The mobile station of claim 13 wherein the first, second and third pluralities of base stations are synchronous with each other.

15. The mobile station of claim 14 wherein the first, second and third pluralities of TOA measurements are synchronous and are derived from a Global Positioning System (GPS).

16. The mobile station of claim 13 wherein the weighting factors are based on signal strengths of the forward link signals from the first, second and third pluralities of base stations.

17. The mobile station of claim 13 wherein one of the following multiple access techniques are employed in acquiring the first, second and third pluralities of TOA measurements: Time division multiple access (TDMA), frequency division multiple access (FDMA), code division multiple access (CDMA) or orthogonal frequency division multiple access (OFDMA).

18. A non-transitory computer-readable storage medium having a computer program comprising instructions, which when executed by at least one processor, operates to estimate velocity and Doppler frequency, the computer program comprising:
    instructions for acquiring a first plurality of time-of-arrival (TOA) measurements of forward link signals from a first plurality of base stations at a first time;
    instructions for acquiring a second plurality of TOA measurements of forward link signals from a second plurality of base stations at a second time;
    instructions for acquiring a third plurality of TOA measurements of forward link signals from a third plurality of base stations at a third time;
    instructions for determining a plurality of line-of-sight (LOS) distance measurements using the first, second and third pluralities of TOA measurements;
    instructions for determining a plurality of velocity estimates and a plurality of angle of arrival (AOA) estimates, using the plurality of LOS distance measurements; instructions for determining a plurality of Doppler frequency estimates using the plurality of velocity estimates and the plurality of AOA estimates; and
    instructions for determining an average Doppler frequency estimate and an average velocity over a plurality of sectors based on corresponding weighting factors, wherein the first, second and third pluralities of TOA measurements are acquired over the plurality of sectors;
    wherein the first, second and third pluralities of TOA measurements are subject to a common constraint value based on which a forward link transmit time is constantly calibrated among the first, second and third pluralities of base stations; and
    wherein the first plurality of base stations does not include base stations of the second and third pluralities of base stations, the second plurality of base stations does not include base stations of the first and third pluralities of base stations and the third plurality of base stations does not include base stations of the first and second pluralities of base stations.

* * * * *